A. M. MacKERSIE.
BUCKRAKE AND STACKER.
APPLICATION FILED APR. 3, 1919.

1,343,398.

Patented June 15, 1920.
3 SHEETS—SHEET 1.

Inventor:
A. M. MacKersie,
by Hazard & Miller
Attys.

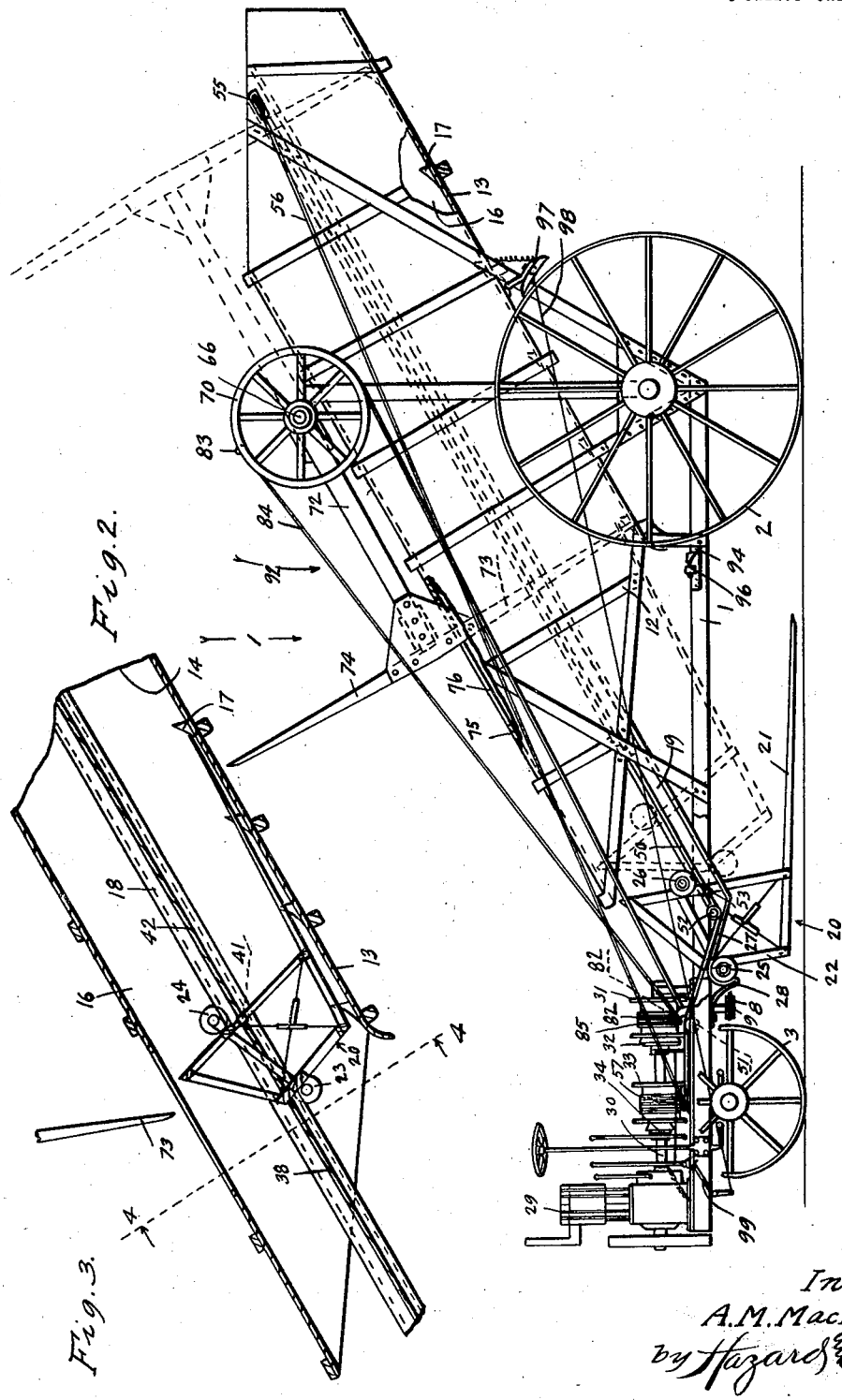

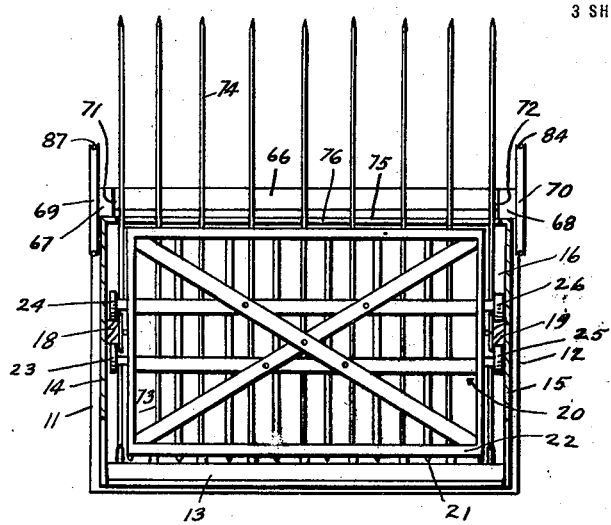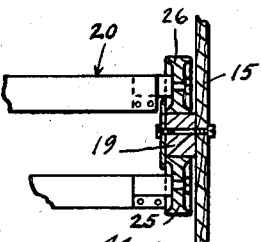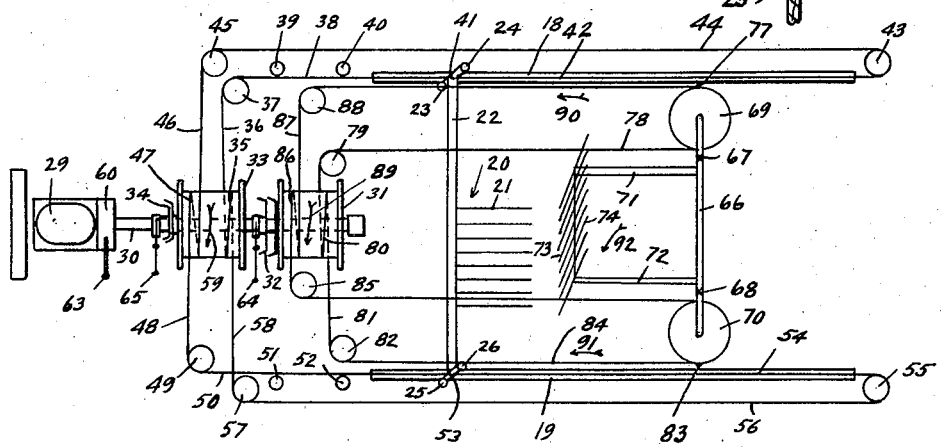

UNITED STATES PATENT OFFICE.

ARTHUR MILTON MacKERSIE, OF SAN JACINTO, CALIFORNIA.

BUCKRAKE AND STACKER.

1,343,398.　　　　Specification of Letters Patent.　　Patented June 15, 1920.

Application filed April 3, 1919. Serial No. 287,292.

*To all whom it may concern:*

Be it known that I, ARTHUR MILTON MACKERSIE, a citizen of the United States, residing at San Jacinto, in the county of Riverside and State of California, have invented new and useful Improvements in Buckrakes and Stackers, of which the following is a specification.

My object is to make a buckrake and stacker, and my invention consists of the novel features herein shown, described and claimed.

Specifically an object of my invention is to gather hay from haycocks or windrows on to a buckrake suspended from a track on the frame of the machine to intermittently elevate the gathered hay on to a platform so as to accumulate a plurality of buckrake loads on the platform then carry the accumulated load to the stack, mow, or bailer feed table and dump the entire load so as to greatly reduce the number of trips from the field to the dumping place in a given quantity of hay.

Fig. 2 is a side elevation as seen looking in the direction indicated by the arrow 2 in Fig. 1.

Fig. 3 is a fragmentary sectional elevation on a plane parallel with Fig. 2 and on the line 3—3 of Fig. 1.

Fig. 4 is a vertical cross section on the line 4—4 of Fig. 3 and looking in the direction indicated by the arrows.

Fig. 5 is a fragmentary sectional detail upon an enlarged scale and upon the same plane as Fig. 4.

Fig. 6 is a diagrammatic view illustrating the operation of the buckrake and stacker without the vehicle construction.

Figure 1:
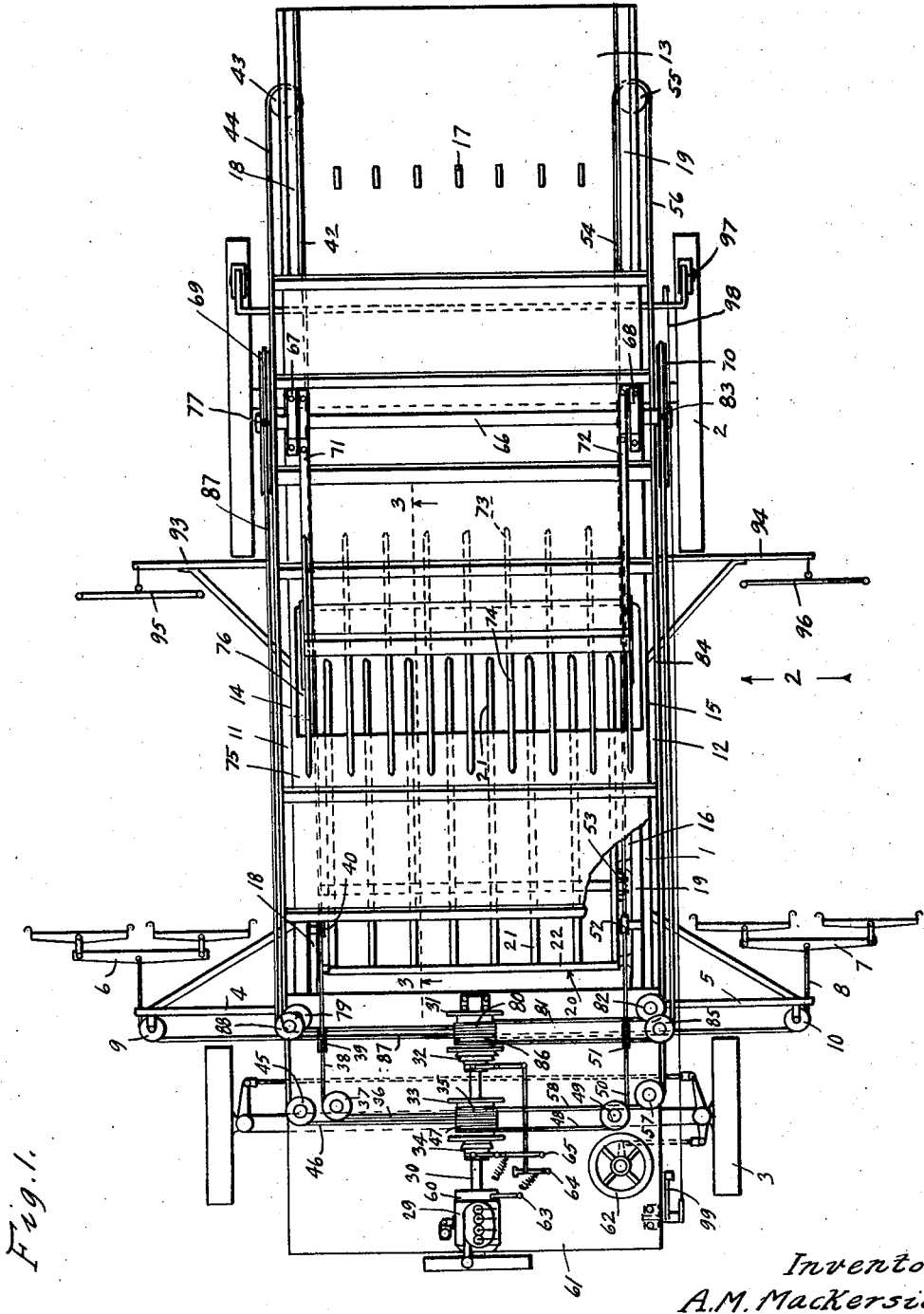
Figure 1 is a top plan view of a buckrake and stacker embodying the principles of my invention, as seen looking in the direction indicated by the arrow 1 in Fig. 2.

The buckrake and stacker mechanism is mounted on a vehicle having a long bed frame 1, front wheels 2, and rear wheels 3. The rear wheels 3 are steering wheels, and the vehicle frame is like an automobile truck frame except that it is run backward, that is the steering wheels are the rear wheels instead of the front wheels. The vehicle is to be drawn by horses. Arms 4 and 5 extend laterally from the rear end of the bed 1, and the double trees 6 and 7 are connected together by a cable 8, the cable 8 running around guide pulleys 9 and 10, the guide pulley 9 being at the outer end of the arm 4, and the guide pulley 10 being at the outer end of the arm 5, and the cable 8 extending across the frame so as to equalize the pull upon the double trees 6 and 7. It is intended that a pair of horses, or the like, be hitched to the double tree 6, and another pair to the double tree 7. The draft animals will be at the sides of the vehicle and far enough back so that the vehicle may be run square up against a stack or the like.

Side frames 11 and 12 extend upwardly and forwardly from the bed 1. A bottom 13 connects the side frames 11 and 12 and extends from a point above and near the forward end of the bed 1. Side walls 14 and 15 are secured to the side frames and extend upwardly from the bottom 13 and backwardly to near the rear end of the bed 1, thus forming a chute 16 for receiving and carrying the loads of hay picked up by the buckrake. The forward end of the chute is above and in front of the forward end of the vehicle, so that hay may be discharged from the chute at an elevation as required to place the hay upon a stack, or in a mow, or upon a bailer feed table. Cleats 17 are secured crosswise to the upper face of the bottom 13, said cleats pointing upwardly and forwardly to assist in holding the hay from sliding backward upon the bottom. A track 18 is secured along the inner face of the wall 14, and a similar track 19 is secured along the inner face of the wall 15, said tracks extending from the bed 1 upwardly and forwardly to the upper forward end of the chute 16.

The buckrake 20 has rake teeth 21 adapted to pick up the haycock, or windrow, and a back frame 22 for mounting and manipulating the teeth 21. A rear roller 23 is carried by the frame 22 to travel under the track 18, and a forward roller 24 is carried by the frame 22 to travel on top of the track 18. In a like manner a roller 25 is carried by the frame 22 to travel under the track 19, and a roller 26 is carried by the frame 22 to travel on top of the track 19. The rollers 23 and 25 are in a transverse line, and the rollers 24 and 26 are in a transverse line. The rollers 24 and 26 are set at an angle relative to the rollers 23 and 25 and relative to the rake teeth 21, so that when the buckrake is moving forwardly and backwardly upon the tracks 18 and 19 the teeth 21 are substantially parallel with the tracks.

The tracks 18 and 19 have extensions 27 at their lower ends extending backwardly and upwardly, so that when the rollers 24 and 26 are near the lower rear ends of the tracks 18 and 19 the rollers 23 and 25 are under the rear ends of the extensions 27, thereby allowing the forward ends of the rake teeth 21 to tip downwardly as required to catch the hay from the ground.

Stops 28 extend downwardly from the bed 1 in position to engage the rollers 23 and 25 and push the buckrake forwardly as the vehicle moves forwardly. The lower rear end of the bottom 13 is above and in front of the forward ends of the rake teeth 21 when the rake teeth are upon the ground, so that the hay gathered by the rake teeth may pile upon the teeth 21 against the frame 22, and when the buckrake is elevated the hay will pass upwardly past the rear end of the bottom 13 into the chute 16.

A gas engine 29 is mounted upon the extreme rear end of the bed 1, the gas engine shaft 30 extends forwardly from the engine 29 longitudinally of the bed, a winding drum 31 is mounted upon the shaft 30 at its forward end and adapted to be connected to and disconnected from the shaft by the clutch 32, and a second winding drum 33 is mounted upon the shaft 30 and adapted to be connected to and disconnected from the shaft 30 by a clutch 34. A cable is wound upon the drum 33 and comprises a portion 35 extending one or more times around the drum, a portion 36 extending from one end of the portion 35 around the guide pulley 37, a portion 38 extending from the portion 36 around the guide pulleys 39 and 40 and connected to the frame 22 at the point 41, the portion 42 extending from the point 41 around the guide pulley 43, the portion 44 extending from the guide pulley 43 around the guide pulley 45, the portion 46 extending from the guide pulley 45 to the portion 47 reversely wound upon the drum 33, the portion 48 extending from the portion 47 to the guide pulley 49, the portion 50 extending from the guide pulley 49 around the guide pulleys 51 and 52 and connected to the frame 22 at the point 53, the portion 54 extending from the point 53 around the guide pulley 55, the portion 56 extending from the guide pulley 55 around the guide pulley 57, and the portion 58 extending from the guide pulley 57 to the opposite end of the portion 35 from the portion 36, so that when the drum 33 is rotated in the direction indicated by the arrow 59 the frame 22 is pulled forwardly and upwardly, and so that when the drum 33 is rotated in the opposite direction the frame 22 is pulled downwardly and backwardly. The direction of the drums is controlled by the reversing transmission gear 60 upon the engine.

The operator will stand upon the platform 61 upon the bed 1 between the engine 29 and the right-hand side of the machine, so that he may readily operate the steering wheel 62, the transmission lever 63, the clutch lever 64 controlling the clutch 32, and the clutch lever 65 controlling the clutch 34.

The fork shaft 66 is mounted in bearings 67 and 68 at the upper sides of the frames 11 and 12, pulley wheels 69 and 70 are fixed upon the extreme ends of the shaft, and arms 71 and 72 are fixed upon the shaft 66 inside of the bearings 67 and 68. A retaining fork 73 extends at right angles from the ends of the arms 71 and 72 and connects the arms together, and a push-off fork 74 extends in the opposite direction from the retaining fork 73. The top 75 connects the upper edges of the walls 14 and 15 to cover the chute 16, there being an opening 76 through the cover, so that when the shaft 66 is turned one way the retaining fork 73 will pass downwardly through the opening 76 and engage the bottom 13 at its lower end to hold the hay upon the bottom from sliding backwardly and downwardly, and when the shaft 66 is rotated half the turn the arms 71 and 72 will swing upwardly and over to the opposite position and the push-off fork 74 will engage the upper end of the bottom 13, as shown in dotted lines in Fig. 2.

A cable is attached to the pulley 69 at the point 77 and the portion 78 extends part way around the pulley 69 and around the guide pulley 79 to the portion 80 wound upon the winding drum 31, and the portion 81 extends from the portion 80 around the guide pulley 82 to the attaching point 83 upon the pulley 70, and the portion 84 extends from the attaching point 83 around the guide pulley 85 to the portion 86 oppositely wound upon the winding drum 31 from the portion 80, and the portion 87 extends from the portion 86 around the guide pulley 88 to the attaching point 77, so that when the engine is running and the clutch lever 64 is manipulated to connect the clutch 32, and the clutch lever 63 is manipulated to run the winding drum 31 in the direction indicated by the arrow 89, then the portion 87 will pull in the direction indicated by the arrow 90 and the portion 81 will pull in the same direction as indicated by the arrow 91, thereby swinging the arms 71 and 72 in the direction indicated by the arrow 92 and moving the retaining fork 73 downwardly to the position shown in Fig. 2, and manipulation of the transmission lever 63 will reverse the operation and the portions 78 and 84 will pull in the opposite direction and swing the arms 71 and 72 in the opposite direction thereby moving the push-off fork 74 to the position shown in dotted lines in Fig. 2.

Arms 93 and 94 extend laterally from the frame 1 just behind the front wheels, and neck yokes 95 and 96 are attached to the outer ends of these arms, the principal function of the neck yokes being to keep the draft animals in place and to aid the draft animals in backing the vehicle away from the stack, or the like. A brake construction 97 is mounted across the forward end of the bottom 13, so that the brakes will engage the front wheels, and a cable 98 extends from the brake mechanism to the foot lever 99, said foot lever being mounted convenient to the operator at the rear end of the frame 1.

In the practical operation the buckrake will be lowered to the ground and the machine moved around over the field to gather up a buckrake load of hay, then the levers 63 and 65 will be operated to raise the buckrake to the position shown in dotted lines in Fig. 2, and then slide the buckrake upwardly in the chute 16, and during this operation the retaining fork 73 will be raised to allow the hay to pass upwardly in the chute until the frame 22 is immediately behind the retaining fork, then the retaining fork will be lowered behind the hay and the buckrake returned to the ground. This operation will continue until the upper end of the chute is sufficiently loaded with hay, then the machine will be moved to the dumping place and the buckrake will be operated to pass upwardly through the chute and push the hay from the chute, then the push-off fork 74 will be operated to push the hay from the buckrake as the buckrake returns to its normal position. During all of these operations the engine is supposed to be running continuously and the draft animals will stop and start to suit the conditions.

Various changes may be made without departing from the spirit of my invention as claimed.

I claim:

1. A buckrake and stacker comprising a vehicle, a hay storage chute mounted upon a vehicle, a retaining fork adapted to hold the hay from slipping downwardly in the chute, a push-off fork for unloading the chute, means for operating the push-off fork, a buckrake mounted upon rollers adapted to gather hay from the ground, tracks for the buckrake rollers adapted to carry the buckrake upwardly into the chute, means for operating the buckrake and means for operating the retaining fork with the operation of the buckrake to hold the hay delivered to the chute by the buckrake.

2. A buckrake and stacker comprising a wheeled vehicle with a storage chute, a buckrake, and means for lowering the buckrake to a horizontal gathering position and then elevating it and moving it into the chute to fill the latter.

3. A buckrake and stacker comprising a wheeled vehicle with a storage chute, a buckrake, means for lowering the buckrake to a horizontal gathering position and then elevating it and moving it into the chute to fill the latter, and means adapted to move from the path of the incoming charge and enter behind the charge to hold it while the rake is withdrawing.

4. A buckrake and stacker comprising a wheeled vehicle with a storage chute, a buckrake operative in a horizontal position to gather hay while the vehicle is moving and when loaded to carry its load up into the chute to fill the latter, and means operative independently of the rake but coöperative therewith to hold the hay when the rake is withdrawing therefrom.

5. A buckrake and stacker comprising a wheeled vehicle with a storage chute, a buckrake operative in a horizontal position to gather hay while the vehicle is moving and when loaded to carry its load up into the chute to fill the latter, and means operative independently of the rake but coöperative therewith to hold the hay when the rake is withdrawing therefrom, said means including a reversible fork.

6. A buckrake and stacker comprising a wheeled vehicle with a storage chute, a buckrake operative in a horizontal position to gather hay while the vehicle is moving and when loaded to carry its load up into the chute to fill the latter, and means operative independently of the rake but coöperative therewith to hold the hay when the rake is withdrawing therefrom, said means including a reversible fork in one position extending across the intake end of the chute, and in its other position extending across the discharge end of the chute.

7. A buckrake and stacker having a storage chute, a buckrake operative to be in a horizontal gathering position and when full to carry the load up into the chute in successive movements until the chute is charged as desired, a fork movably mounted in the intake end of the chute, and means for removing the fork to permit the charge to enter, and for reversing the fork when the rake is driven to the discharge end of the chute so as to prevent the return of the hay.

8. A hay stacker comprising a wheeled frame adapted to be moved over a field, and a buckrake operative in successively repeated steps to gather hay from the ground and carry it up into a storage chute on the vehicle, and after the chute is sufficiently filled then operative to discharge the entire load from the upper and outer ends of the chute.

9. A hay stacker comprising a wheeled frame adapted to be moved over a field, a buckrake operative in successively repeated steps to gather hay from the ground and carry it up into a storage chute on the vehicle, and after the chute is sufficiently filled then operative to discharge the entire load from the upper and outer end of the chute, and a hay retaining fork adapted to be intermittently raised and lowered as the rake successively feeds charges into the chute, said fork holding the hay against discharge from the chute at the intake end and being operative to reverse its position and prevent the return of the hay when the rake is in the discharging position to unload the chute.

In testimony whereof I have signed my name to this specification.

ARTHUR MILTON MacKERSIE.